United States Patent [19]

Akashi et al.

[11] 4,437,752
[45] Mar. 20, 1984

[54] SAFETY DEVICE FOR CAMERA AND ACCESSORY

[75] Inventors: Akira Akashi; Makoto Katsuma; Masaharu Kawamura, all of Kanagawa; Shigeru Kamata, Tokyo; Syuichiro Saito, Kanagawa, all of Japan

[73] Assignee: Canon Kabushiki Kaisha, Tokyo, Japan

[21] Appl. No.: 445,158

[22] Filed: Nov. 29, 1982

[30] Foreign Application Priority Data

Nov. 28, 1981 [JP]  Japan .............................. 56-191505
Dec. 2, 1981 [JP]  Japan .............................. 56-194183

[51] Int. Cl.[3] .......................................... G03B 17/00
[52] U.S. Cl. ............................... 354/289.12; 354/286
[58] Field of Search ................. 354/286, 289; 324/51; 340/652

[56] References Cited

U.S. PATENT DOCUMENTS 4,023,153  5/1977  Adachi ............................. 340/652
4,092,656  5/1978  Lang et al. ....................... 354/286
4,130,358  12/1978  Lang et al. ...................... 354/289

Primary Examiner—Russell E. Adams
Attorney, Agent, or Firm—Toren, McGeady and Stanger

[57] ABSTRACT

The disclosed safety device electrically senses the conductivity between the electrical contacts of a camera and an accessory attached thereto, and, upon detection of a failure in conductivity, produces a warning signal for the user.

7 Claims, 14 Drawing Figures

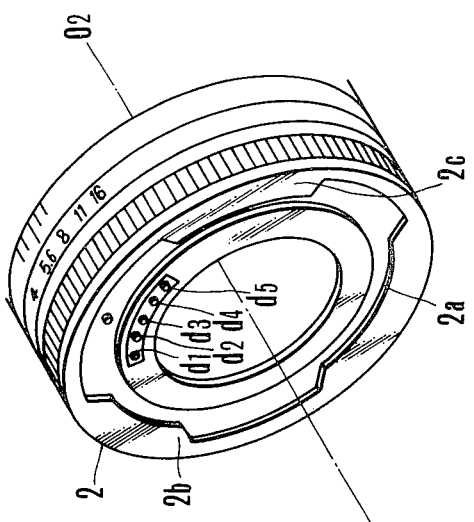
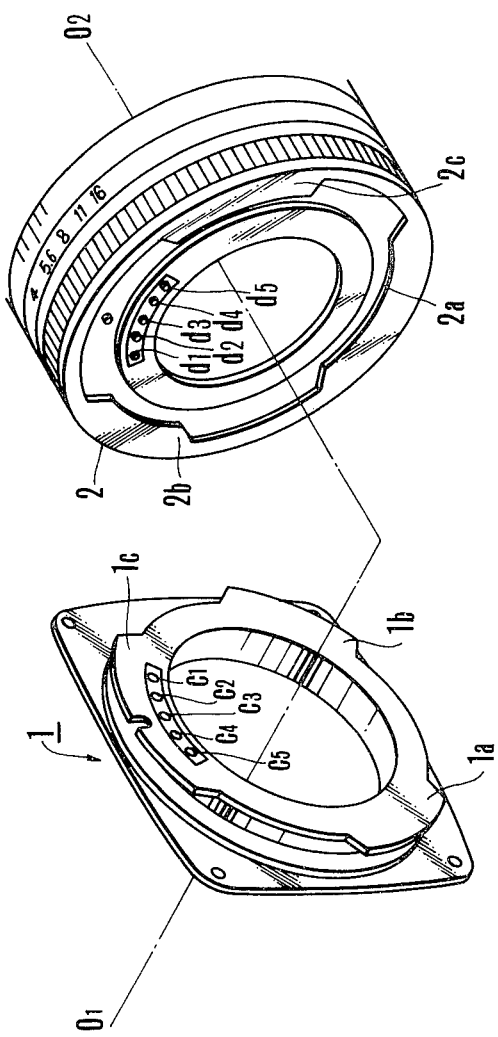

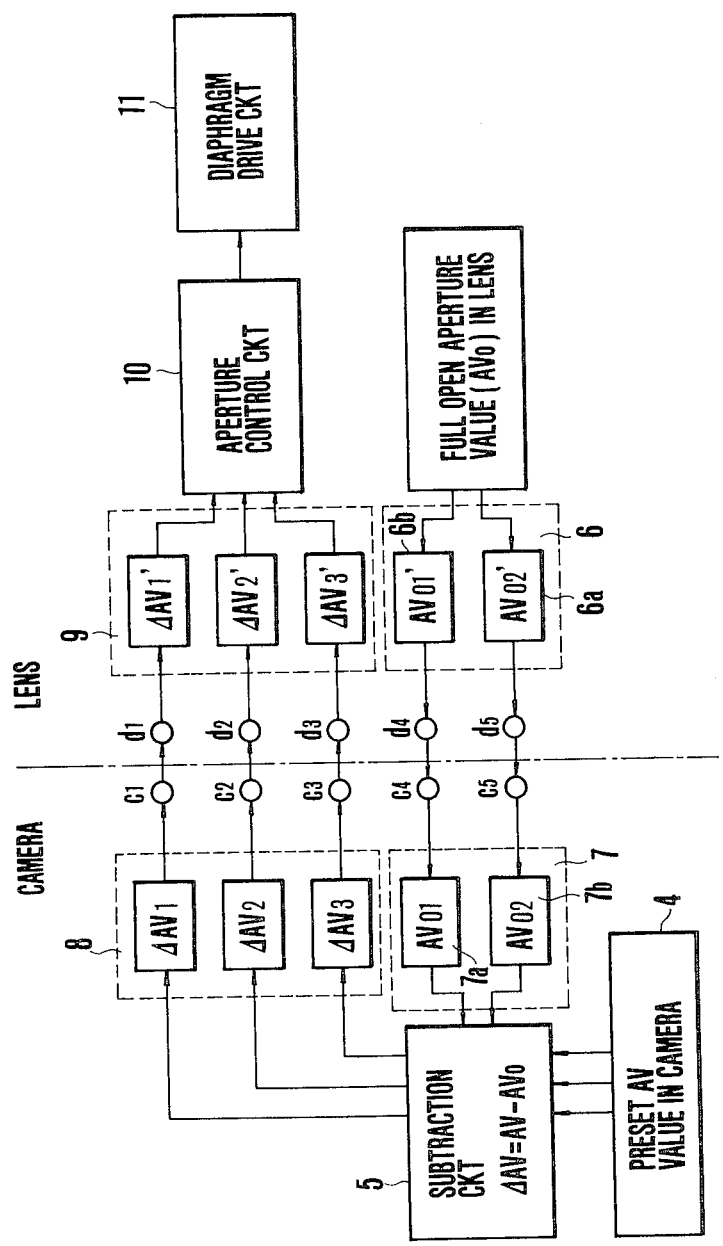

SAFETY DEVICE FOR CAMERA AND ACCESSORY

BACKGROUND OF THE INVENTION

1. Field of the Invention

This invention relates to imaging instruments such as single lens reflex cameras and video cameras having interchangeable objectives or other accessories releasably attached thereto with interconnections for electrical signals therebetween, and more particularly to a device for detecting a failure to establish conductivity between contact at the interconnections, so as to provide assurance that the electrical signals are transferred reliably.

2. Description of the Prior Art

Bayonet devices and screw mounts are often used for coupling cameras and interchangeable lenses. These coupling arrangements do not always insure that when the interchangeable lens and the camera body are in lock with each other, the exposure control signals are transferred between the camera body and the lens with sufficient fidelity to produce proper photographs.

The manner in which these coupling arrangements operate are generally such that the interchangeable lens is first lined up with the camera body, then inserted into the mount of the camera, and then turned about the optical axis relative to the camera over a predetermined angle. If the aforesaid angle is not reached, the complete camera will not perform an accurate and reliable exposure control operation.

A number of safety devices have been proposed to lock the coupling arrangement of the interchangeable lens with that of the camera in the right position. This includes, for example, U.S. Pat. Nos. 4,092,656 and 4,130,358.

In recent years, techniques of electrically controlling the operation of the diaphragm device in the interchangeable lens with a stepping motor or other electromagnetic drive means, and of automatically adjusting the position of the focusing lens member in accordance with the output of the range finding means with the use of an electric motor, have been and are being developed. Cameras and interchangeable lenses employing such techniques are, therefore, required to have electrical signal transmitting channels at or near the coupling arrangements thereof.

In a camera and/or interchangeable lens provided with an electrical signal transmitting channel in the form of a pair of interconnection terminals it will happen that even when an optical or mechanical coupling between the camera and interchangeable lens is made secure, the interconnection terminals fail to make good electrical contact. If so, that is, a sufficient conductivity between the signal terminals of the camera and interchangeable lens is not established, the camera with the interchangeable lens attached thereto will not operate normally.

SUMMARY OF THE INVENTION

An object of the present invention is to provide a device for detecting failure in establishing good contact of the aforesaid electrical signal transmitting arrangement, to make it possible for the operator to become aware of occurrence of something wrong about the signal transmission and to check it.

Another object of the present invention is to provide a device responsive to detection of when an instrument body and an accessory in mechanical combination are not well connected with each other electrically for producing a warning signal that informs the operator of the fact that something wrong is not in the electrical circuitry of the instrument body and the accessory, or in other interconnections, thus enabling the operator to quickly turn to re-establish the signal transmission.

In a preferred embodiment of the invention, a control signal to a circuit for checking the conductivity between the electrical signal transmitting contacts of an imaging instrument body and an accessory attached thereto, is in the form of the output signal of an exposure control circuit in the imaging instrument, so as advantageously to check whether or not the imaging instrument and the accessory in combination are electrically and properly connected to each other.

A further object of the present invention is to provide an electrical connection checking device responsive to occurrence of something wrong between the contacts of the electrical connection of a camera and attachment in combination for producing a warning signal in the form of a sound to the operator. This allows the operator to be informed of a failed interconnection with more exactitude.

A further object of the present invention is to provide a safety device responsive to detection of non-conductivity of the electrical signal transmission contacts of the camera and the interchangeable lens when inserting the latter into the mount of the former for hindering turning of the interchangeable lens so that the operator is obliged to check the aforesaid transmission contacts, thus assuring the establishment of the good conductivity therebetween.

BRIEF DESCRIPTION OF THE DRAWINGS

FIGS. 1a and 1b are fragmentary perspective views illustrating the positions of electrical signal transmitting contacts (c1 to c5 and d1 to d5) on the mounts of a camera and an interchangeable lens employing one form of the present invention with an optical axis 01-02 bent for the purpose of clarity.

FIG. 2 is a signal flow chart of an exposure control system between the camera and interchangeable lens.

FIG. 8 is a signal flow chart of an exposure control system in between the camera and the lens.

FIG. 9 is an electrical circuit diagram, partly in block form, of the third embodiment of the present invention.

FIG. 10 is a pulse timing chart illustrating the manner in which the circuit of FIG. 9 operates.

FIG. 11 is an electrical circuit diagram illustrating the details of the OR circuit OR1 and block ΔAV1' with their interconnection terminals c1 and d1 in contact upon receipt of a signal from the window comparator 129 to effect a voltage drop.

DETAILED DESCRIPTION OF THE PREFERRED EMBODIMENTS

Figure 3:
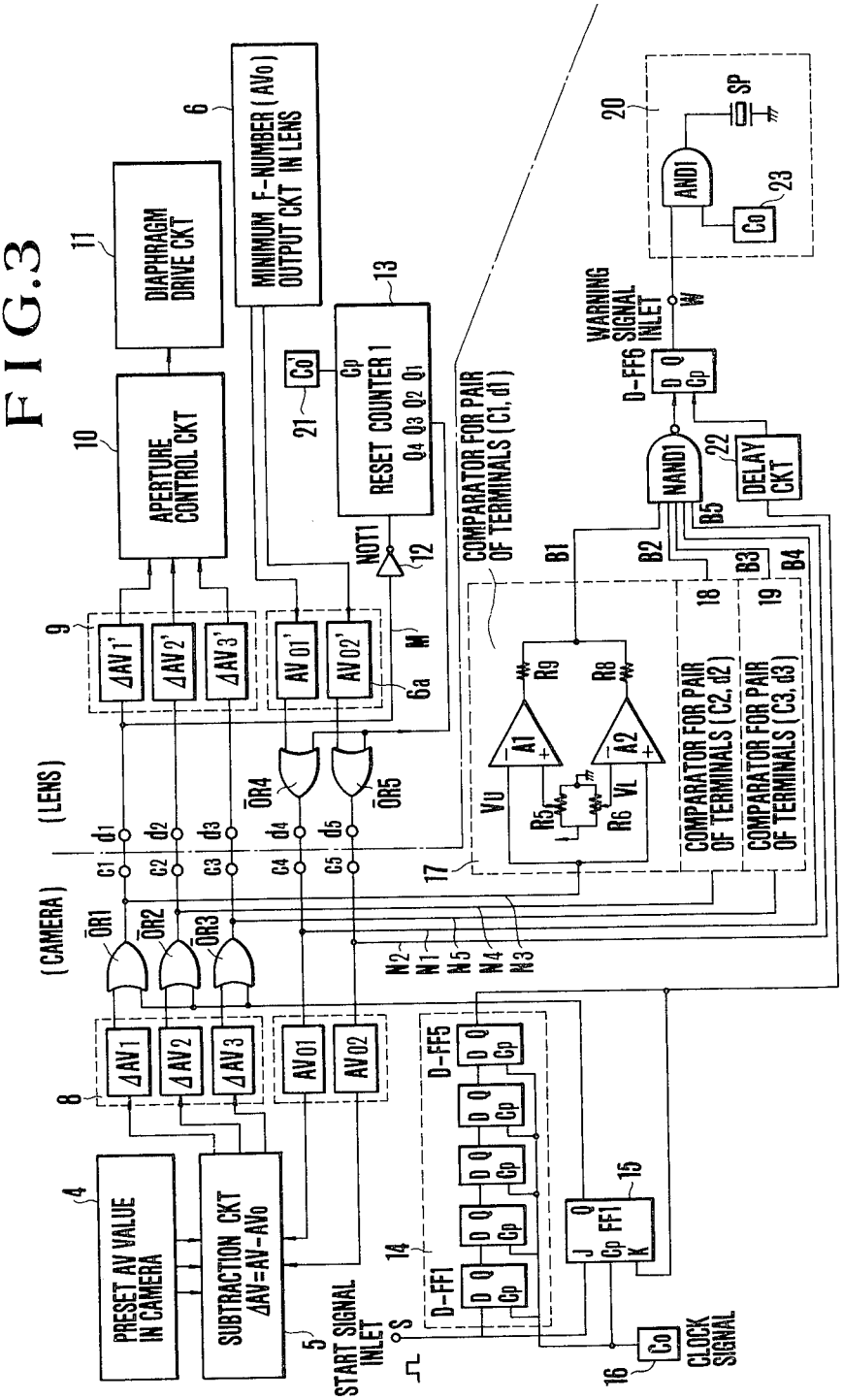
FIG. 3 is an electrical circuit diagram, partly in block form, of an embodiment of the present invention.

The present invention will next be described in connection with embodiments thereof by reference to the drawings.

FIGS. 1 to 5 show one embodiment of the present invention as applied to a single lens reflex camera. The camera body has a coupling means, for example, a bayonet mount 1 (FIG. 1a) in which is inserted an interchangeable lens having a coupling means 2 (FIG. 1b). The bayonet mount 1 is fixed to a housing (not shown) of the camera, has bayonet pawls 1a, 1b and 1c, and is provided with electrical signal outlets c1 to c3 and inlets c4 and c5 from and to an electrical circuit to be described later. A bayonet mount ring 2 rotatable relative to a body tube of the interchangeable lens mounting has bayonet pawls 2a, 2b and 2c to be coupled with the camera's bayonet pawls 1a, 1b and 1c, and is provided with electrical signal inlets d1 to d3 and outlets d4 and d5 in alignment with the camera's outlets c1 to c3 and inlets c4 and c5 respectively.

In FIG. 2, the inlets and outlets c1 to c5 and d1 to d5 are shown in electrical contact to establish electrical signal transmitting channels between the camera and the lens whose conductivity is to be checked. An exposure value computer circuit 4 in the camera derives an aperture value (AV) based on the output from exposure factor input means known to those skilled in the art. This aperture value AV signal is applied to a subtraction circuit 5 which is also given information representing the full-open aperture value of the used lens. This information is derived from a full-open aperture value output circuit 6 in the form of a 2-bit signal by converter circuits 6a and 6b therein. This signal is transmitted through the d4-to-c4 and d5-to-c5 channels to a full-open aperture value input circuit 7 having circuits 7a and 7b with their outputs connected to respective inputs for the aforesaid subtraction circuit 5. For example, when the lens used has a fully open or minimum-possible aperture value of F/1.0, the fully open aperture value information is converted to a two-bit logic signal [00] in passing through the output circuit 6. In the case of values F/1.2 and F/1.4, the signal is in the form of [01] and [10] respectively. In the subtraction circuit 5, the aforesaid computed aperture value of the exposure value computer circuit 4 is subtracted from the full open aperture value to produce an aperture value difference ΔAV after having been converted to an electrical signal in a three-bit form is transmitted past a circuit 8 to the aforesaid outlets c1, c2 and c3 provided in the bayonet mount 1 of the camera. The signal produced at the outlets c1, c2 and c3 is information representing the aperture value determined based on the signal of the preset values of exposure factors and taking the form of a 3-bit signal to be transferred from the camera to the lens. For example, when the aperture values ΔAV of the output of the subtraction circuit 5 is five in F-number, the binary coded form is 101 so that an output of logic level "1" appears at the outlet or interconnection terminal c1, and output of logic level "0" at the terminal c2 and an output of logic level "1" at the terminal c3. Thus, when the logic symbol is "1" or "0", an electrical signal of high or low level are respectively produced. This aperture value signal ΔAV goes past the channels c1, c2, c3, d1, d2 and d3 and further past a lens mounted transmission circuit 9 to a diaphragm control circuit 10 and therefrom to a diaphragm drive circuit 11, so that the size of the aperture opening of a diaphragm (not shown) is adjusted to a computer presetting ΔAV.

FIG. 3 illustrates a practical example of a circuit responsive to detection of whether or not the conductivity of each of the aforesaid electrical signal transmitting channels is adequate by using the system of transition of the electrical signals across the paired interconnection terminals c1 to c5 and d1 to d5 of the camera and the lens for producing a warning signal. In the drawing, a NOT circuit 12 in the lens receives an output signal from the first inlet or terminal d1 in the lens and forms a check mode signal detecting circuit with a counter 13. A clock pulse generator 21 controls the operation of the counter 13.

Turning next to that portion of the circuit which is disposed in the camera, a symbol S denotes an inlet to which is given an actuating signal to start a conduction checking operation. This actuating signal is a pulse signal produced from a one-shot pulse forming circuit (not shown) when a release button, for example, on the camera housing may be pushed down, and enters the input Q of register 14 and the input J of a JK flip-flop 15. The shift register comprises five D flip-flops connected in series to each other.

Figure 4:
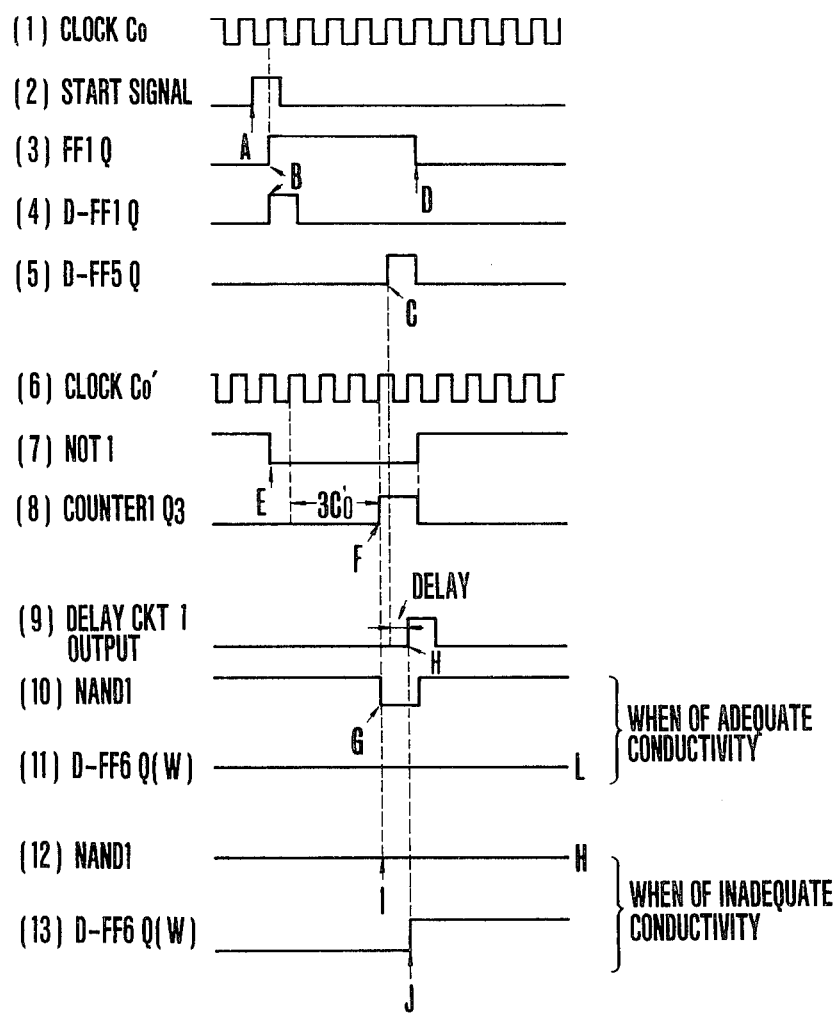
FIG. 4 is a pulse timing chart illustrating a manner in which the circuit of FIG. 3 operates.

The following discussion is conducted in connection with the pulse timing chart of FIG. 4. The check start signal (on line (2)) is maintained at a logic level "1" (electric high level H) for a given period during which time the outputs Q of JK flip-flop circuit 15 and the first-stage D-FF1 in block 14 change to logic level "1" in synchronism with the clock pulse from the generator 16 as illustrated on lines (4) and (5). Thus, the camera side is switched to a conduction checking mode. Since shift register 14 is of the 5-stage form with D-FFs 1 to 5, the signal from the output Q of D-FF1 after having passed through D-FFs 2 to 5 arrives at the output Q of D-FF5 when the 4th clock pulse is produced from the generator 16 (line (5)).

Since the output Q of D-FF5 is connected to an input K terminal of JK flip-flop 15, this results in the next or 5th clock pulse changing the output Q of JK-FF1 to logic level "1". (a point D on line (3))

The output signal (on line (3)) appearing at the output terminal Q of that JK flip-flop circuit 15 functions as a check mode signal for permitting the check of the conduction, and is applied to one of each of the inputs of OR circuits OR1, OR2 and OR3, the opposite inputs of which are connected to the respective outputs of the aforesaid ΔAV1, ΔAV2 and ΔAV3 in block 8. The outputs of OR circuits OR1 to OR3 are connected to the camera electrical signal outlets c1, c2 and c3 respectively. Blocks 17, 18 and 19 are window comparators for pairs of the interconnection terminals c1 and d1, c2 and d2, and c3 and d3 respectively, of which only the one for the first pair of terminals c1 and d1 is illustrated in detail, since the other comparators 18 and 19 are similar in construction thereto.

A NAND circuit NAND1 has five inputs receptive of the outputs signals B1 to B5 of the aforesaid window comparators 17, 18 and 19 and signals N1 and N2 from the camera's fourth and fifth electrical signal inlets c4 and c5, and has an output which is connected to an input D of a flip-flop circuit D-FF6.

An announcing arrangement 20 receives the signal from the D-FF6 and responds to non-conduction of any of the electrical signal transmitting channels for producing an announcement, and in this instance, is composed of a loud speaker SP, and AND circuit AND1 and an oscillator 23.

The following first explains the operation of the device of this construction on the assumption that the conductivity of the first channel of terminals c1 and d1 is adequate.

Figure 5:
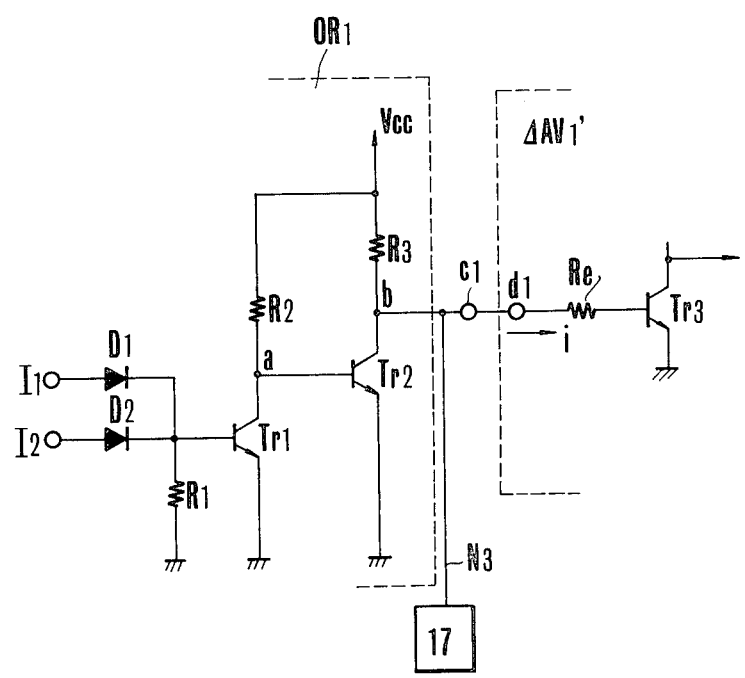
FIG. 5 is an electrical circuit diagram illustrating the details of the OR circuit OR1 and block $\Delta AV1'$ with interconnection terminals c1 and d1 in contact upon receipt of a signal from a window comparator 17 to effect a voltage drop.

FIG. 5 illustrates the details of the first OR circuit OR1 in the camera and of the signal transmitting circuit ΔAV1' in the lens. Inlets I1 and I2 are connected to the outputs of ΔAV1 and JK flip-flop 15 respectively.

When the output Q of JK flip-flop circuit 15 goes to logic level "1", a diode D2 is rendered conductive so that a current flows through a resistance R1 to turn on a transistor Tr1. Because of a voltage drop across the ends of a resistance R2, the potential at a point "a" on connection between the resistance R2 and the collector of transistor Tr1 is then lowered to render a transistor Tr2 non-conductive. Hence, the potential at a point "b" on the collector of transistor Tr2 is raised. Thus, the output of OR circuit OR1 goes high. That is, a signal of logic "1" level appears at the outlet c1.

Since the outlet or terminal c1 is assumed to be in good contact with the inlet d1 in the lens, a current "i" is allowed to flow through the channel of terminals c1 and d1 to the base electrode of a transistor Tr3 in the circuit ΔAV1'. A resistance Re, therefore, produces a certain voltage drop at the inlet d1 and the outlet c1. This voltage drop of outlet c1 goes through a signal line N3 to window comparator 17 for the first channel, in which the input N3 is examined whether or not to fall within prescribed upper and lower limits. Upon detection of when the input N3 is in or out of the prescribed range, the window comparator 17 produces a signal of logic "1" or "0" respectively. Because the first electrical signal transmitting channel is of adequate conductivity, the terminal c1 is given a signal representing the voltage drop due to the resistance Re through the signal line N3. This output of the signal line N3 resulting from the voltage drop by the resistance Re is preadjusted to a value lying between the prescribed upper and lower limits. When the adequate conductivity across the first terminals c1 and d1 in contact is now established, window comparator 17 produces an output B1 of high or logic "1" level. As the aforesaid voltage drop occurs, the resultant output from the lens terminal d1 passes through a signal line M to NOT circuit NOT1 (12) which then produces an inverted output in the form of a pulse signal illustrated in FIG. 4(7). This signal from NOT circuit 12 has to enter counter circuit 13 along with a train of clock pulses (FIG. 4(6)). Responsive to the fourth clock pulse counting from the release from the reset state, counter circuit 13 changes its output at the stage Q3 to a high or logic "1" level (FIG. 4(8)). The output signal from the stage Q3 is applied through OR circuits OR4 and OR5 to the outlets d4 and d5, and, if the conductivity across the fourth and fifth pairs of terminals c4 and d4, and c5 and d5 is adequate, further proceeds to the signal lines N1 and N2, reaching the NAND circuit NAND1.

The second and third OR circuits OR2 and OR3 for the second and third channels are similar to the first one illustrated in FIG. 5. If adequate conductivity is established across the second and third pairs of terminals c2 and d2 and c3 and d3 when in contact with each other, a similar voltage drop to that across the first pair of terminals c1 and d1 is produced at the signal lines N4 and N5. As a result, the window comparators 18 and 19 produce outputs B2 and B3 respectively each of which is high.

Therefore, when the first to fifth electrical signal transmitting channels are all of adequate conductivity, as the inputs of NAND1 all assume high or logic "1" levels, they produce a low output or logic "0" level, which is then applied to the input D of flip-flop circuit D-FF6.

Upon consideration of the facts that the input signals of NAND1 are more or less delayed in passing therethrough, and that the clock pulse generators 16 and 21 in the camera and the lens do not coincide in phase with each other, a delay circuit 22 is used in the clock input of flip-flop D-FF6 so that the output of D-FF5 in block 14 after having been delayed by a suitable time (FIG. 4(9)) arrives as a synchronizing signal at the clock input Cp of D-FF6. In this case, or where the conductivity of each of the electrical transmitting channels is detected as being in good condition, the output Q of D-FF6 is maintained at a low level (FIG. 4(11)), and an actuating signal for the warning signal forming circuit 20 does not appear at the terminals W thereof.

Next assuming that the first electrical signal transmitting channel is less conductive because the outlet c1 and the inlet d1 are out of good contact with each other, or dust or foreign particles intervene therebetween, then even when the signal from the aforesaid subtraction circuit 5 or the output signal from the aforesaid JK flip-flop circuit 15 assumes a high or logic "1" level, no current "i" flows through the resistance Re to the base of transistor Tr3. Therefore, a high level signal appears at the outlet c1. This signal passes through the signal line N3 to window comparator 17. Since the prescribed upper voltage level is exceeded, window comparator 17 produces an output B1 of low or logic "0" level. Therefore, even though the other electrical signal transmitting channels c2-to-d2, to c5-to-d5 are of adequate conductivity, NAND1 is made to produce an output of high or logic "1" level. Responsive to this signal and the output signal of the aforesaid delay circuit 22 illustrated in FIG. 4(9), D-FF6 produces a warning signal W illustrated in FIG. 4(13) which is then applied to a speaker circuit 20. The loud speaker SP is therefore activated in synchronization with the clock pulses 23. Thus, the operator is informed of the fact that the lens has not well electrically connected to the camera.

Figure 6:
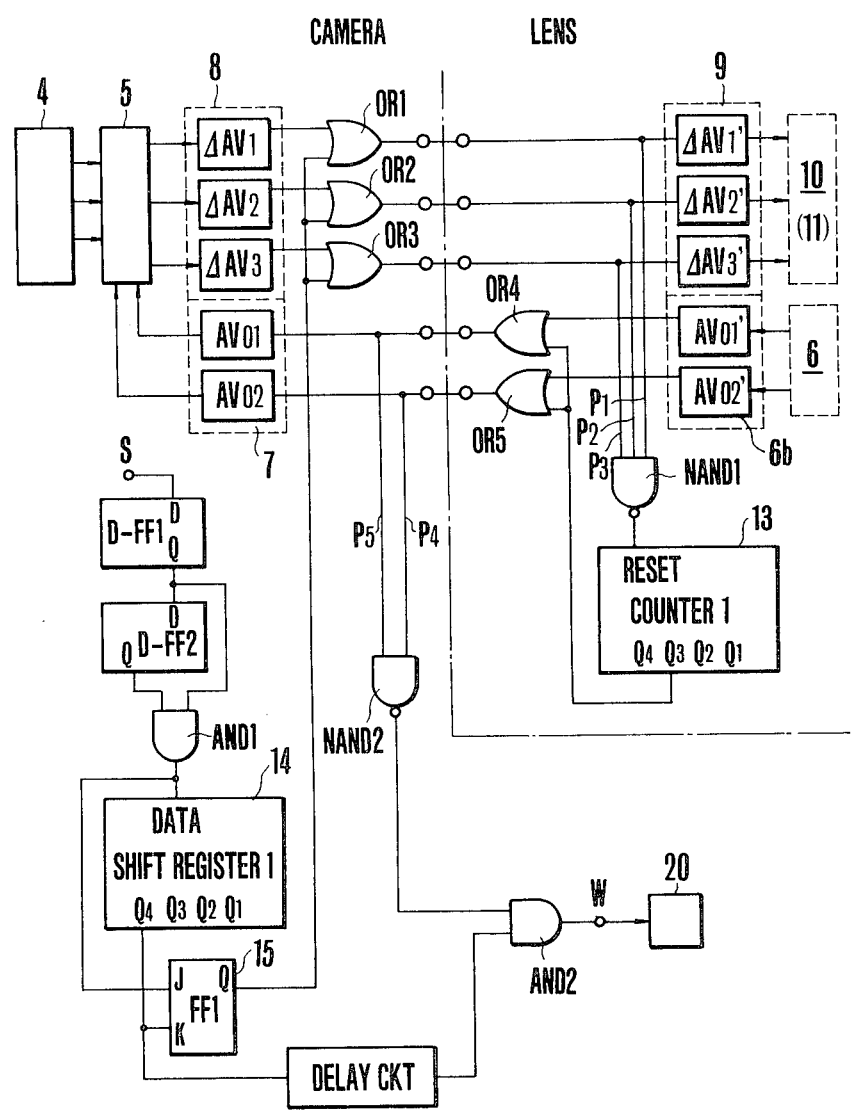
FIG. 6 is an electrical circuit diagram, partly in block form, of another embodiment of the present invention.
Figure 7:
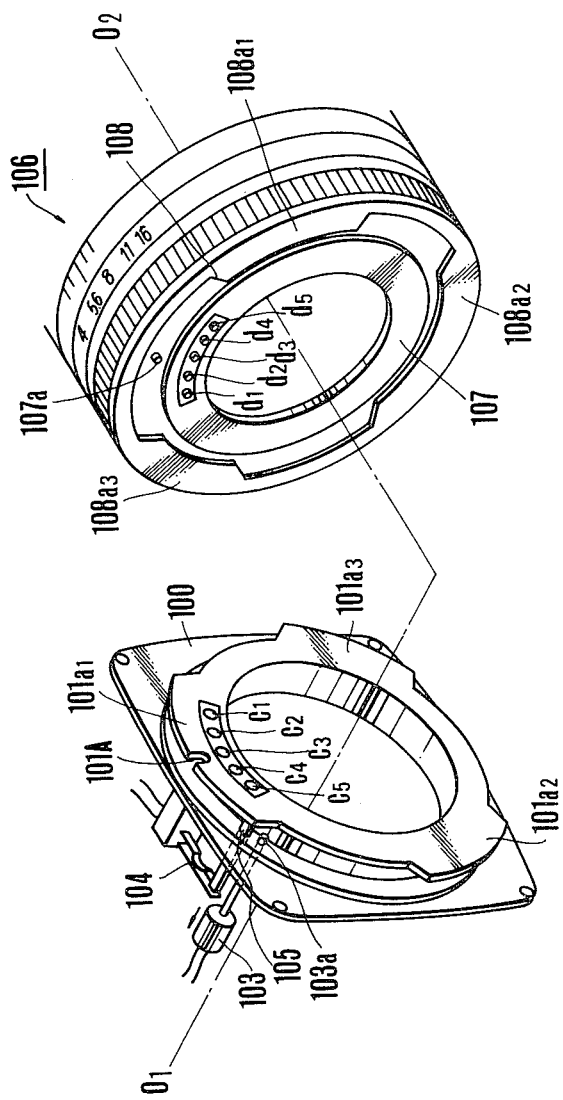
FIGS. 7 to 11 illustrate a third embodiment of the present invention applied to a camera and an interchangeable lens with their mounts provided with electrical signal transmitting interconnection terminals (c1-c5 and d1 to d5) wherein an optical axis 01-02 is illustrated as bent for the purpose of clarity.

FIG. 6 illustrates a second embodiment of the present invention where the same reference characters have been employed to denote the similar parts to those shown in FIG. 3.

The feature of the embodiment of FIG. 3 is that when the first to third electrical signal transmitting channels are in good conductivity, a voltage drop is caused by the circuit of FIG. 5, while when in poor conductivity, no voltage drop is produced. Depending upon the presence or absence of the voltage drop, the output of window comparator 17 is adjusted to a high or low level, thus controlling the actuation of the speaker circuit. This first embodiment has an advantage that the presetting of the output signal on the basis of the input signals N3 to N5 by the window comparator 17 can be adjusted with high accuracy so that the accuracy of conduction check of the electrical signal transmitting channels can also be heightened. But the circuit structure becomes complicated.

FIG. 6 shows a circuit of simplified structure. The gates OR1, OR2 and OR3 in the camera produce check mode signals which pass through the c1-to-d1, c2-to-d2 and c3-to-d3 channels respectively to the lens. If the channels are adequately conductive, the signals pass through the signal lines P1, P2 and P3 to the NAND1. Therefore, the NAND1 produces an output of low level. Responsive to this output, the counter 13 is released from the reset condition and produces a signal at its output stage Q3 illustrated in FIG. 4(8). Assuming again that the d4-to-c4 and d5-to-c5 channels are adequately conductive, then the output Q3 of counter 13 arrives at signal lines P4 and P5 in the camera. Responsive to the signals P4 and P5, a gate NAND2 produces an output of low level that does not serve as the effective warning signal W. Alternatively assuming that any of the channels c1-d1 to c5-d5 is non-conductive, the output of NAND 2 becomes high, causing an AND circuit AND2 to produce the warning signal W.

As described, the present invention provides instruments, having electrical signal inlets and outlets c1 to c5 and d1 to d5 to transmit electrical signals ($\Delta AV1$ to $\Delta AV3$, $AV01'$ and $AV02'$) therethrough when in contact, with a device having window comparators 17 to 19 and NAND1 (FIG. 5 and FIG. 6) to check whether the conductivity across the inlet and outlet is adequate or inadequate. The detecting signal makes it possible to give off a warning signal representing the fact that the aforesaid electrical signal inlet and outlet have not come into operative connection with each other. The use of this built-in device allows the operator to clearly know where something is wrong and therefore to quickly turn to re-establish channels of adequate conductivity.

The warning signal of FIGS. 5 and 6 may be otherwise applied to, for example, a light emission control circuit so that the failure to establish the electrical signal transmitting channels of adequate conductivity results in a light signal. In application to cameras or the like where the data to be displayed in the finder are too many to avoid mis-recognition of the operator, a sound signal is preferred for presenting the information as in the illustrated embodiments.

Also, with regard to the way of utilizing the warning signal W of the above-described embodiments, when the failure to establish the electrical connection of adequate conductivity is detected, the resulting signal may be applied also to an operation prohibiting circuit in the camera so that the sequence of operations of the various portions of the camera is interrupted so as to give an additional advantage, namely that electrical energy can be saved.

It is to be further noted that the start signal for the conduction checking operation of FIG. 3 may be otherwise formed by using a separate switch to a one-shot pulse.

FIGS. 7 to 11 illustrate a third embodiment of the present invention where when the failure of establishing the electrical signal transmitting channels of adequate conductivity is detected, the process of coupling an accessory to the camera is automatically interrupted, thereby making the operator aware of it.

FIGS. 7a and 7b in perspective views illustrate the coupling means of the camera (FIG. 7a) and the lens (FIG. 7b). A bayonet mount member 100 of the camera has pawls $101a_1$, $101a_2$, and $101a_3$ to engage a lens bayonet mount member to be described later. The bayonet pawl $101a_l$ is provided with a cutout 101A.

Electrical signal terminals c1 to cn carry an exposure signal $\Delta AV$ and a current supply signal from an exposure control circuit in the camera to be transferred to the lens, and, in this instance, have five terminals c1, c2, c3, c4 and c5.

A plunger 103 is fixed to the back side of the bayonet mount member 100 by suitable means. A movable pin 103a of the plunger 103 is arranged to project out of a penetration hole provided in the mount base 100 toward the bayonet pawl $101a_1$ and to retract therefrom.

A switch means or arrangement 104 has a movable contact on which an actuator rod 105 abuts. This actuator rod 105 is movably fitted in a penetration hole of the mount base 100 and has its free end tapered so that when the lens is turned relative to the camera, the bayonet member of the lens pushes it in a direction indicated by arrow. This takes the movable contact of the switch means 104 out of engagement with its fixed contact or the switch arrangement is opened.

An interchangeable objective or like attachment body 106 has a mount member 107 which is restrained from rotation relative to the camera. The mount member 107 has a confronting surface to the aforesaid camera on which is mounted a pin 107a aligned with a cutout portion 101A of the bayonet pawl $101a_1$ of the camera. A bayonet ring 108 is fixedly mounted on the stationary portion of the attachment body and provided with pawled portions $108a_1$, $108a_2$ and $108a_3$ to engage the camera's bayonet pawls $101a_1$, $101a_2$ and $101a_3$.

Electrical signal inlets and outlets d1, d2, d3, d4 and d5 are arranged to contact the camera's terminals c1, c2, c3, c4 and c5 respectively, and positioned on the member 107.

To mount the lens or like attachment 106 on the camera, the pin 107a of the lens' mount member is lined up with the cutout 101A of the camera and placed in the mount 100. This holds the mount member 107 non-rotatable relative to the camera. Thereupon, the pairs of the camera side and lens side electrical signal terminals c1-d1, c2-d2, c3-d3, c4-d- and c5-d5 are adjusted in opposition to each other and come into contact. Then the lens is turned, until it locks with a click. It should be pointed out here that when the connection in each pair of the terminals is of adequate conductivity, the aforesaid plunger 103 acts so that the movable pin 103a is fully retracted into the aforesaid penetration hole, thus permitting the lens to be turned. But when a disconnection in any one of the pairs of the terminals is detected, the plunger 103 does not operate, leaving the movable pin 103a to lie in the path of movement of the bayonet pawl $108a_1$ of the lens. Therefore, the operator cannot proceed the mounting operation of the lens and is obliged to re-establish the aforesaid electrical signal transmitting channels of adequate conductivity.

Figure 8:
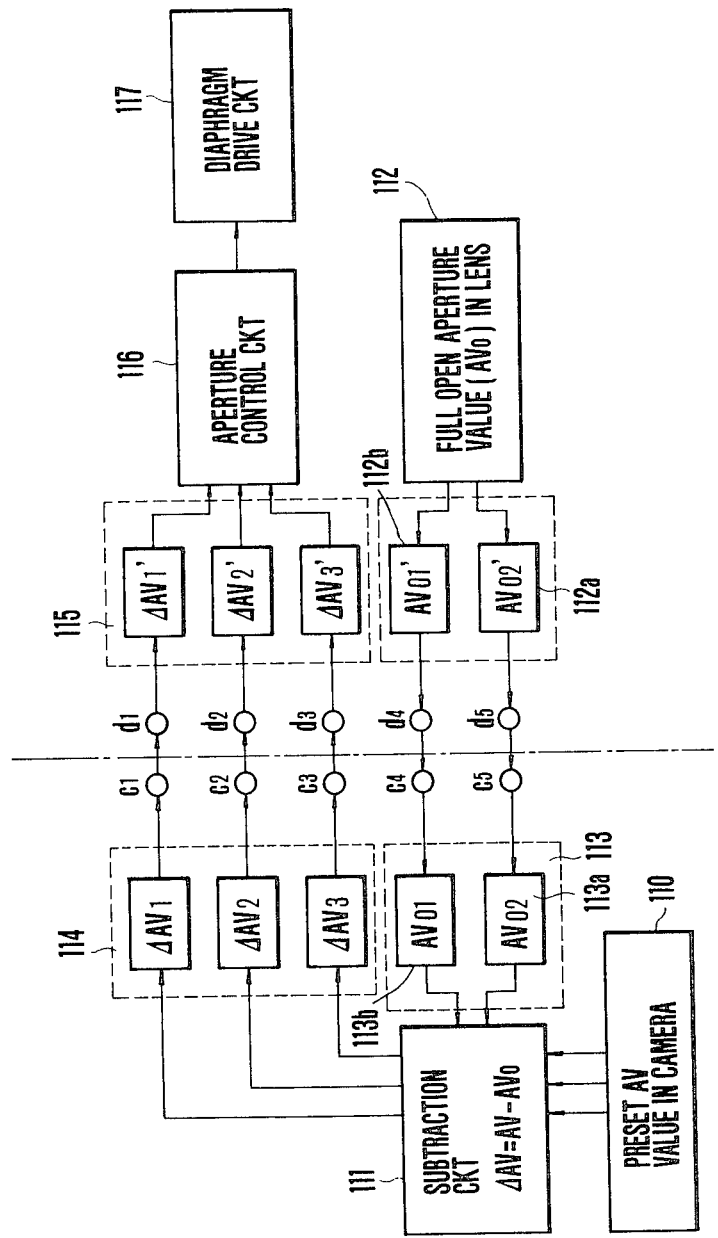

FIG. 8 illustrates an exposure control system across the camera and the lens in the present embodiment. Since this system is the same as the one in FIG. 2, only the following explanation is given here.

In FIG. 8:

Member 110 is a camera aperture value AV computer circuit;

Member 111 is a subtraction circuit;

Member 113 is a fully open aperture value AVo input circuit;

Member 114 is a camera signal transmission circuit;

Member 112 is a lens fully open aperture value information generating means;

Members 112a, 112b are the lens signal transmission circuits;

Member 115 is an aperture value ΔAV input circuit;

Member 116 is a diaphragm control circuit; and

Member 117 is a diaphragm drive circuit.

Figure 9:
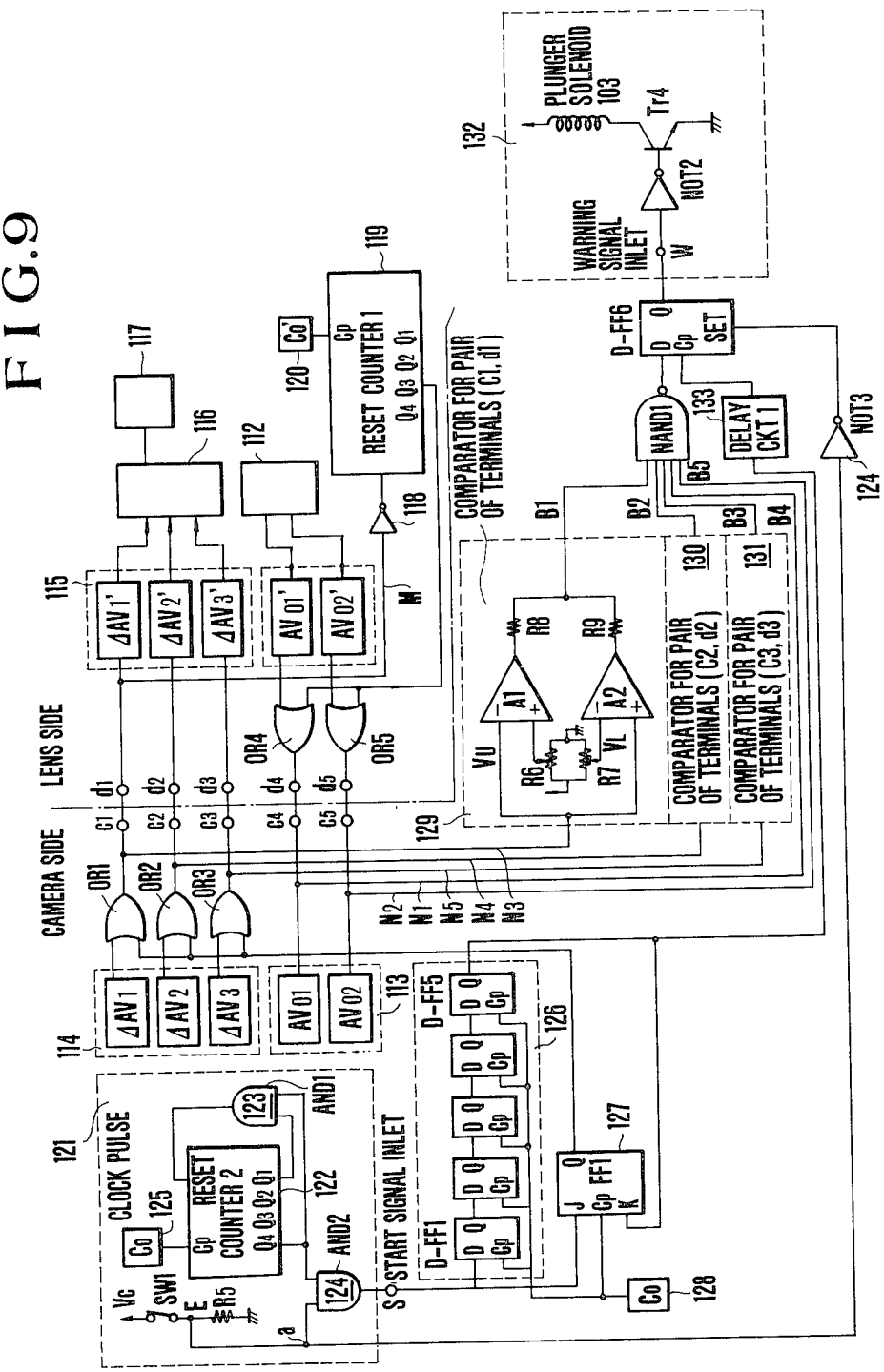

FIG. 9 illustrates an embodiment of the invention as an example of using the system of transmitting exposure control signals through the terminals c1 to c5 and d1 to d5 between the camera and the lens in detecting whether or not the conductivity of the aforesaid electrical signal transmitting channels is adequate and to allow or hinder the mounting operation of the lens to the to the camera. In the drawing, a NOT circuit 118 detects the output signal from the lens' first electrical signal terminal d1 and forms a check mode signal detecting circuit together with a counter 119. A clock pulse generator 120 controls the operation of the counter 119.

A circuit produces a checking operation start signal for checking the conductivity of each of the electrical signal transmitting channels between the camera and the lens when the lens is being mounted to the camera. The circuit 121 is constructed of a counter 122, AND circuits 123 and 124, a clock pulse generator 125 and a switch SW1. A train of clock pulses (FIG. 10(1)) enter the counter 122 with its output stages Q1 and Q4 connected to respective inputs of AND circuit 123 of which the output is connected to the reset terminal of the same counter 122. Therefore, counter 122 is reset every 8 clock pulses and produces a pulse at the output stage Q4 in synchronism with the 8th clock pulse in each resetting cycle. This pulse is taken as the conductivity check start signal. This start signal is connected to one of the two inputs of AND circuit 124, the other input of which is supplied with a signal of high or low level depending upon the opening or closure of switch SW1. The switch SW1 is the above-described switch 104 of FIG. 7. This switch SW1 is arranged to open when the lens is mounted to the camera as the forward edge of the pawl $108a_1$ of the lens side bayonet ring passes over the tapered portion of the movable rod 105 to move the movable contact of the switch 104 (SW1) away from the fixed contact thereof. The switch SW1 is closed when the camera is in isolation, or is of the normally closed type. The fixed contact of this switch SW1 is connected to a constant voltage source Vc. One input terminal of AND circuit 124 is connected to a junction point of switch SW1 and a resistance R5. This input terminal "a" of AND circuit 124 is supplied with an electrical signal of high voltage "1" when the lens is removed from the camera, or when the movable pin 103a of the plunger 103 is not retracted due to the low-conductivity of the aforesaid electrical signal transmitting channel, and with an electrical signal of low voltage "0" when the electrical signal transmitting channels are adequately conductive. Therefore, in response to the output signal from the aforesaid counter 122, and to the output signal resulting from the opening and closing operation of the aforesaid switch SW1, AND circuit 124 produces an output start signal "s" illustrated in FIG. 10(2).

This output signal "s" of AND circuit 124 is applied to a shift register 126 having a row of five flip-flops (D-FFs) and to a JK flip-flop 127.

Figure 10:
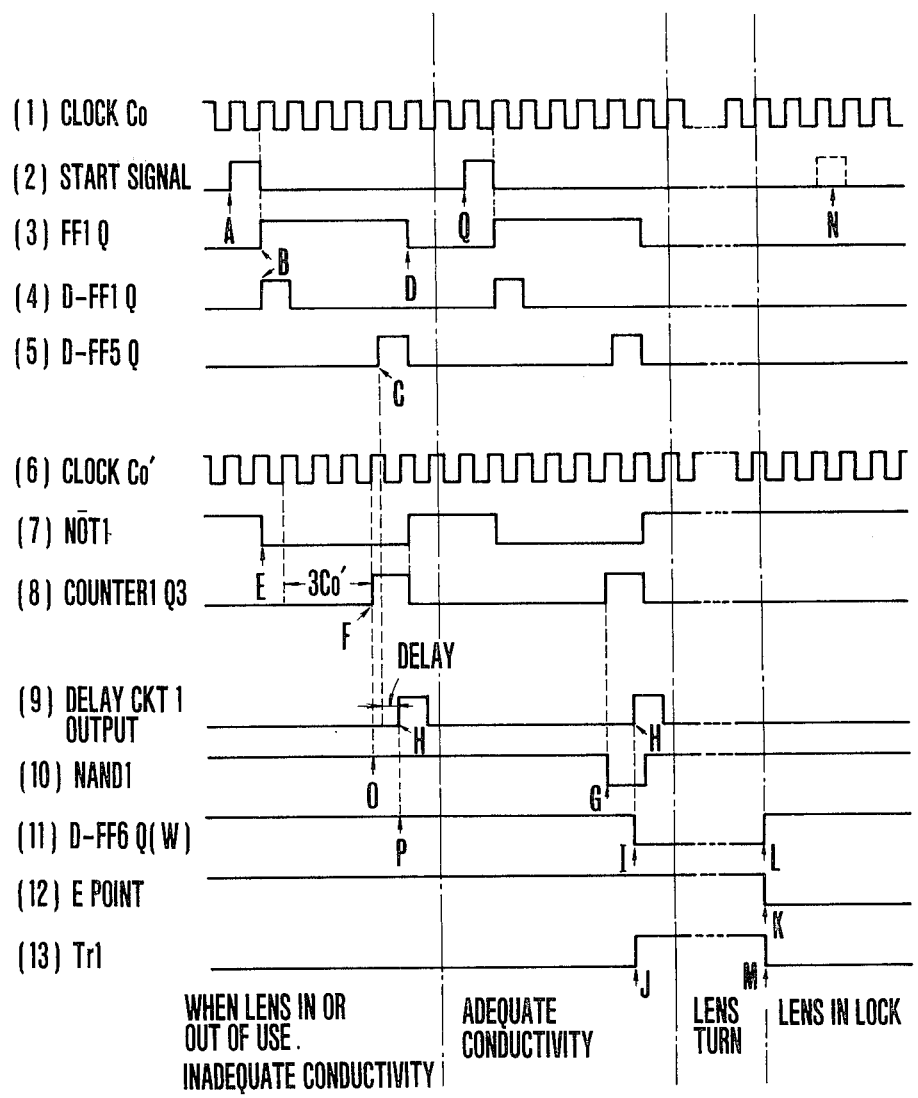

The checking operation start signal (FIG. 10(2)) is maintained at logic "1" level (electrically high potential signal H) for a certain period so that the outputs Q of JK flip-flop circuit 127 and the first stage or D-FF1 of D flip-flop circuit 126 become logic "1" in synchronism with the clock pulse from the generator 128 as illustrated in FIGS. 10(3) and 10(4). Hence, the camera is switched to the conductivity check mode.

Since the shift register 126 has five stages of D-FF1 to D-FF5, the output Q of D-FF1 is successively processed through D-FF2 to D-FF5, so that D-FF5 changes its output Q to logic "1" when the clock pulse circuit 128 produces the fourth clock pulse (FIG. 10(5)).

Since the output stage Q of D-FF5 is connected to the input terminal K of JK flip-flop 127, it follows that responsive to the next or fifth clock pulse, FF1 127 changes its output Q to logic "0" (at a point D in time on line (3) in FIG. 10). This output signal of high level (FIG. 10(3)) from JK flip-flop circuit 127 is the check mode signal for allowing the conductivity check to go on, and is applied to one of the two inputs of each of OR circuits OR1, OR2 and OR3, the other inputs of which are supplied with the outputs of ΔAV1, ΔAV2 and ΔAV3 of the aforesaid circuit 114 which represent a computed exposure value in this instance, aperture value and which are to be sent to the lens. The outputs of OR1, OR2 and OR3 are connected to the outlets c1, c2 and c3 respectively. Reference numerals 129, 130 and 131 denote window comparators for c1-to-d1, c2-to-d2 and c3-to-d3 channels respectively, of which only the first comparator 129 is illustrated in detail, while the other comparators 130 and 131 are illustrated in block form since they have the same circuit construction.

A NAND circuit NAND1 has five inputs which are connected to the outputs of the aforesaid window comparators 129, 130, 131 and the camera side fourth and fifth electrical interconnection terminals c4 and c5 respectively, and has an output which is connected to the input D of a flip-flop circuit D-FF6. A circuit 132 receives the signal from the flip-flop D-FF6 and responds to detection of good-conductivity of all of the electrical signal transmitting channels for actuating the plunger 103. In this embodiment, the circuit 132 is constructed with a NOT circuit NOT2 and a transistor Tr4.

The following is an explanation of the operation of the circuit of FIG. 9 on the assumption that the first or c1-to-d1 channel is adequately conductive.

Figure 11:
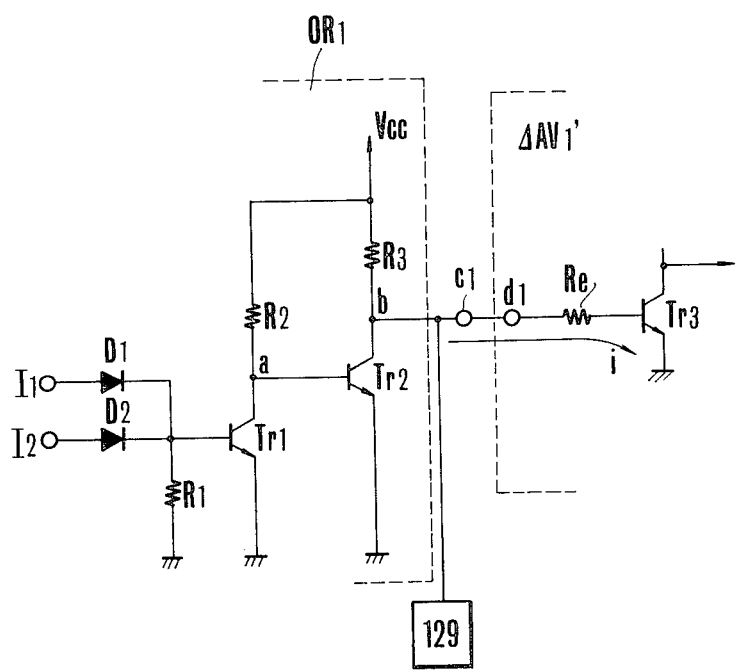

FIG. 11 illustrates the details of the camera's OR circuit OR1 and the lens' signal transmission circuit ΔAV1'. Input signals I1 and I2 are respective input signals from the ΔAV1 and JK flip-flop 127. When the output Q of JK flip-flop circuit 127 changes to logic "1", a diode D2 is rendered conductive and a current flows to a resistance R1. Then, a transistor Tr1 is rendered conductive. A voltage drop across the ends of a resistance R2 causes the potential at the collector 'a' of transistor Tr1 to become low. Responsive to this, a transistor Tr2 is rendered non-conductive, so the potential at the collector 'b' of transistor Tr2 is changed to high. In other words, the output of OR circuit OR1 is changed to high or logic "1".

When the high potential appears at the outlet c1 of the camera, a current "i" is allowed to flow to the ΔAV1' since the outlet c1 and the inlet d1 are in good contact so as to establish a channel of adequate conductivity. The current "i" then flows into the base of a transistor. Therefore, a certain voltage drop is formed across the inlet d1 and outlet c1 by a resistance Re. This voltage drop of the outlet c1 is transferred through a signal line N3 to the first window comparator 129. The window comparator 129 detects whether or not the input N3 falls in a range between preset upper and lower voltage values. When the input N3 lies in the range, a signal level of logic "1" is produced. When the input N3 is out of the range, a signal of logic "0" level is produced. Since the aforesaid first electrical signal transmitting channel c1-d1 is of adequate conductivity, a signal representing the voltage drop by the resistance Re is applied through the signal line N3 to the terminal c1. It is to be noted that the output of the signal line N3 resulting from the voltage drop by the resistance is preadjusted so as to fall within the prescribed range between the upper and lower voltage limits of the aforesaid window comparator 129. With this, when the adequate conductivity is established across the first outlet and inlet c1 and d1 in contact, window comparator 129 produces an output B1 of high or logic "1" level. The first inlet d1 of the lens transfers the above-described voltage drop through a signal line M to NOT circuit NOT1 (118). Then, NOT circuit 118 produces a pulse signal illustrated in FIG. 10(7). This signal from NOT circuit 118 has along with the clock pulse signal (FIG. 10(6)) to enter counter circuit 119. In response to the fourth clock pulse after the release from the reset state, the counter circuit 119 produces a signal of high or logic "1" level at the output terminal Q3 (FIG. 10(8)). This signal passes through OR circuits OR4 and OR5 to the outlets d4 and d5. When the outputs d4 and d5 are in good contact with the inlets c4 and c5, the signals of high or logic "1" level appear at the signal lines N1 and N2 respectively, and enter the NAND circuit NAND1.

The second and third OR circuits OR2 and OR3 of which the outputs are connected to the second and third outlets c2 and c3 are similar to that of FIG. 11. When the second and third electrical signal transmitting channels are of adequate conductivity, a similar voltage drop to that across the first channel takes place in each of the signal lines N4 and N5. As a result, the outputs B2 and B3 of window comparators 130 and 131 assume high or logic "1" levels.

Therefore, when the adequate conductivity is established in all the first to fifth electrical signal transmitting channels c1-d1 to c5-d5, all the input terminals of NAND1 are supplied with the signal of high or logic "1" level. Then NAND1 produces a signal of low or logic "0" level (FIG. 10(10)).

The aforesaid output of NAND1 is applied to flip-flop D-FF6. By taking into account the facts that the input signals for the NAND circuit NAND1 are susceptible of more or less delaying action in passing through any gate, and that the periods of the aforesaid lens and camera clock pulse generators 120 and 128 do not coincide with each other, use is made of a delay circuit 133 in the input stage of flip-flop D-FF6. The output of the delay circuit (FIG. 10(9)) serves as the synchronizing signal for flip-flop D-FF6. In this case, or where the establishment of the adequate conductivity in all the electrical signal transmitting channels is detected, the output of D-FF6 changes to low (FIG. 10(11)). This signal is inverted in passing through NOT circuit NOT2; hence transistor Tr4 is rendered conductive to actuate the plunger 103. Thus, the movable detent pin 103a is retracted from the path of movement of the bayonet pawl. It is to be noted that what has been done until this time is only that the bayonet pawls of the lens mate with the recessed portions of the bayonet mount of the camera and the affirmation of the result of checking the conductivity of the aforesaid electrical signal transmitting channels c1-d1 to c5-d5 is finished, and, therefore, that a tightening operation by turning the lens is not started yet. Because of this, switch SW1 is not opened yet, so that the signal at point E in block 121 of FIG. 9 remains high. Therefore, D-FF6 is not supplied with a "set" signal. Since the detent pin 103a has been retracted by the energized plunger, the operator will then turn the lens. Thus, the actuator rod 105 is moved in a direction indicated by arrow by the bayonet pawl actuating on the tapered portion thereof, and the switch SW1 is opened. It is at this time that the signal illustrated in FIG. 10 (12), at the aforesaid point E changes to a low level. This signal after having been inverted by NOT circuit 134 is applied to set the flip-flop D-FF6. Then transistor Tr4 becomes non-conducting as illustrated in FIG. 10 (13) to de-energize the plunger 103. Such change of the signal at the point E also causes the output signal, which is a check mode start signal, of the AND circuit 124 to stop.

Next assuming that the first outlet and inlet c1 and d1 are out of contact or dust or other foreign particles intervene therebetween so that the channel of adequate conductivity is not established, then even when the signal from the subtraction circuit 111 or the output signal from the JK flip-flop circuit 111 or the output signal from the JK flip-flop circuit 127 goes high or to the logic "1" level, no current "i" flows through the resistance Re of FIG. 11 to the base electrode of transistor Tr3, hence permitting a signal of high level to appear at the outlet c1. This signal is directed through the signal line N3 to window comparator 129. Since the preset upper voltage limit is exceeded, window comparator 129 produces the output signal of low or logic "0" level. Therefore, even though the other channels c2-d2 to c5-d5 are all adequately conductive, NAND1 produces a signal of high or logic "1" level. Responsive to this signal and the signal (FIG. 10(9)) from the aforesaid delay circuit 133, D-FF6 produces a warning signal W illustrated in FIG. 10 (11). This signal is then inverted by the NOT circuit NOT2. As a result, transistor Tr4 is left non-conducting, and the detent pin 103a of the plunger 103 is maintained in a position to prevent the bayonet member of the lens from being turned.

Figure 12:
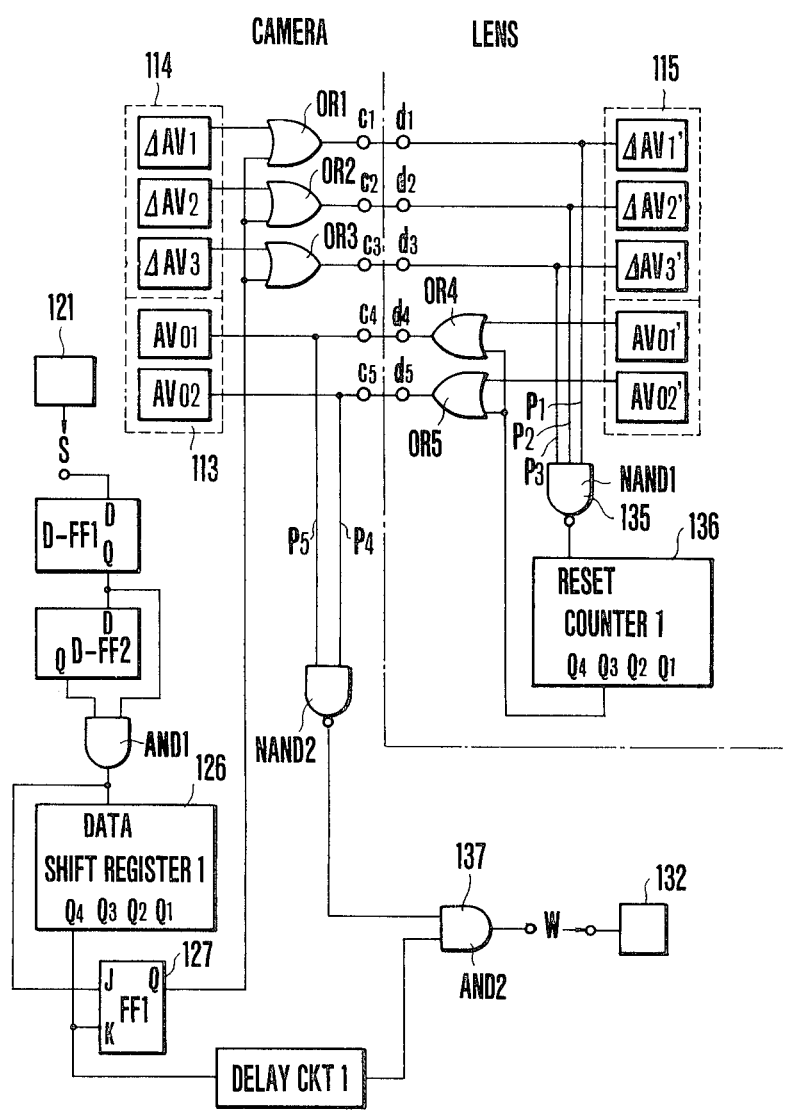
FIG. 12 is an electrical circuit diagram of a fourth embodiment of the present invention.

FIG. 12 illustrates a fourth embodiment of the present invention where the same reference characters have been employed to denote the similar parts to those shown in FIG. 9.

The feature of the embodiment illustrated in FIG. 9 is that when the first to third electrical signal transmitting channels are of adequate conductivity, a voltage drop is made to occur by the circuit of FIG. 11, and when of inadequate conductivity, it does not take place. Depending upon the presence and absence of the voltage drop, the output of the window comparator 129 is controlled to change between the high and low levels to control the operation of the plunger 103. This third embodiment has an advantage that the presetting of the output signal based on the input signals N3 to N5 can be accurately adjusted by virtue of using the window comparators 129 to 131 so that the possibility of increasing the accuracy of checking the conductivity of the electrical signal transmitting channel can be achieved. But the structure of the circuit is made complicated.

FIG. 12 illustrates another embodiment of the invention where the circuit structure is simplified. The check mode signals from the OR1 to OR3 in the camera are applied through the channels c1-d1 to c3-d3 to the lens. If the channels c1-d1 to c3-d3 are of adequate conductivity, the check mode signals appear at the respective signal lines P1, P2 and P3. Responsive to the signals, a NAND circuit 135 produces an output signal of low or logic "0" level which is then applied to release a counter 136 from the resetting state. Then, counter 136 produces an output signal illustrated in FIG. 10(8) at the output terminal Q3 thereof. If the channels c4-d4 and c5-d5 are both of adequate conductivity, the signal Q3 passes through signal lines P4 and P5 to the NAND circuit 138, causing production of a signal of low level which does not serve as the warning signal. Otherwise, when any one of the channels c1-d1 to c5-d5 is non-conductive, the output of the NAND circuit 138 assumes a high level, thus producing the warning signal W through AND circuit 137.

As has been described in greater detail above, the present invention provides instruments having electrical interconnection terminals c1 to c5 and d1 to d5 to transmit signals (ΔAV1 to ΔAV3 and AV01' and AV02') therethrough, with a device for sensing the conductivity of each of the interconnections and upon detection of the failure to establish adequate conductivity of the contact of the interconnection terminals in each pair, by using window comparators 129 to 131 and NAND1 (FIGS. 11 and 12), to produce a warning signal. This offers the advantage that the operator is immediately informed of where something wrong has occurred when setting the instrument, and is able to quickly know how to cope with it.

A way of utilizing the aforesaid warning signal of the invention, involves an automatic interruption of the sequence of operations of the various portions of the camera. This thereby produces an additional advantage that the premature consumption of the electrical power source or battery is avoided. It should be noted in connection with FIG. 3 that the start signal for the conductivity checking operation may be otherwise formed, for example, as a one-shot pulse by using a separate switch accessible independent of the release button on the camera.

What we claim:

1. A device for detecting the conductivity of camera and accessory signal terminals through which an electrical signal is given or received between electrical circuits in a camera and in an accessory attached thereto, comprising:
   means for detecting the failure to establish adequate conductivity across said signal terminals and for producing a discrimination signal representing whether or not the conductivity is adequate when said camera and said accessory signal terminals are in contact with each other; and
   annunciating means responsive to said discrimination signal for producing an annunciation signal.

2. A detecting device according to claim 1, further including:
   signal generating means for checking the conductivity of said signal terminals,
   said signal generating means being arranged for producing a check operation start signal of a given duration from the start of a release operation and for then applying the start signal to said detecting means so that within the given time from the start of the release operation, the conductivity of said signal terminals is being checked.

3. A detecting device according to claim 2, further including:
   a first logic circuit for receiving the signals of said electrical circuit and said signal generating means and for producing a logic signal corresponding to the conducting condition of said signal terminals, and
   a second signal terminal for receiving an output signal from said first logic circuit.

4. A device for detecting the conductivity of a signal terminal through which an electrical signal is given or received between electrical circuits in a camera and in an accessory, comprising:
   (a) a first signal terminal through which an electrical signal is given or received between the camera and the accessory;
   (b) a first circuit connected between said electrical circuit in the camera and said first signal terminal, said first logic circuit being arranged for producing an electrical signal corresponding to the conducting condition of the signal terminal between the camera and the accessory;
   (c) a second signal terminal for receiving a logic signal based on the output signal from said first logic circuit;
   (d) detecting means receptive of the signal from said second signal terminal for producing a discrimination signal representing whether or not the conductivity of said first and said second signal terminals is adequate; and
   (e) annunciating means for producing an annunciation signal based on the signal from said detecting means.

5. An accessory for attachment to a camera having a detecting device of claim 3 or 4, comprising:
   signal processing means for receiving a signal of said first signal terminal and producing a logic signal corresponding to the conducting condition of said first signal terminal to said second signal terminal.

6. A device for detecting the conductivity of a signal terminal through which an electrical signal is given and received between electrical circuits in a camera and in an accessory, comprising:
   (a) means for coupling said camera and said accessory with each other,
   said coupling means having a mount member fixed to a body of said camera or said accessory,
   a tightening member in said accessory or camera side for engaging said mount member;
   (b) coupling prohibiting means for prohibiting said mount member for engaging said tightening member when the conductivity of said signal terminal is inadequate; and
   (c) a control circuit for controlling the drive of said coupling prohibiting means by a signal based on the conducting condition of said signal terminal.

7. A device according to claim 6, further including:
   means for releasing current supply to said control circuit with the coupling operation of said coupling means.

* * * * *